United States Patent
Alles et al.

(10) Patent No.: US 7,302,493 B1
(45) Date of Patent: Nov. 27, 2007

(54) SYSTEM AND METHOD FOR PROVIDING DESIRED SERVICE POLICIES TO SUBSCRIBERS ACCESSING THE INTERNET

(75) Inventors: Anthony L. Alles, Sunnyvale, CA (US); Arthur Lin, San Ramon, CA (US); Shyam Prasad Pillalamarri, Palo Alto, CA (US); Kent Huntley Headrick, Newark, CA (US); Thomas Daly, San Carlos, CA (US); David Mullenex, Foster City, CA (US)

(73) Assignee: Nortel Networks Limited, St. Laurent (CA)

( * ) Notice: Subject to any disclaimer, the term of this patent is extended or adjusted under 35 U.S.C. 154(b) by 755 days.

(21) Appl. No.: 10/264,053

(22) Filed: Oct. 3, 2002

Related U.S. Application Data

(63) Continuation of application No. 09/205,041, filed on Dec. 3, 1998, now Pat. No. 6,466,976.

(51) Int. Cl.
*H04L 12/56* (2006.01)
*G06F 15/16* (2006.01)
(52) U.S. Cl. .................... 709/238; 709/230; 370/389
(58) Field of Classification Search ................ 709/224, 709/225, 238–244
See application file for complete search history.

(56) References Cited

U.S. PATENT DOCUMENTS

| | | | | |
|---|---|---|---|---|
| 5,951,651 A | * | 9/1999 | Lakshman et al. | 709/239 |
| 6,046,980 A | * | 4/2000 | Packer | 370/230 |
| 6,047,322 A | * | 4/2000 | Vaid et al. | 709/224 |
| 6,078,953 A | * | 6/2000 | Vaid et al. | 709/232 |
| 6,154,775 A | * | 11/2000 | Coss et al. | 709/225 |
| 6,157,955 A | * | 12/2000 | Narad et al. | 709/228 |
| 6,167,445 A | * | 12/2000 | Gai et al. | 709/223 |
| 6,606,710 B2 | * | 8/2003 | Krishnan et al. | 713/201 |
| 6,625,650 B2 | * | 9/2003 | Stelliga | 709/226 |
| 6,678,248 B1 | * | 1/2004 | Haddock et al. | 370/412 |
| 2003/0061338 A1 | * | 3/2003 | Stelliga | 709/224 |

* cited by examiner

Primary Examiner—Patrice Winder
(74) Attorney, Agent, or Firm—Withrow & Terranova, PLLC

(57) ABSTRACT

An internet service node (ISN) enabling the provision of desired service policies to each subscriber. The desired service policies for each subscriber are provided as an input. The desired service policies are translated into processing rules. Each processing rule contains a classifier and associated action. A classifier generally identifies the application data flows to which the action may be applied to provide the desired service policies. The processing rules may be generated dynamically to implement the specified service policies for each subscriber. Each data bit group may be classified to associate with a subscriber and only the processing rules corresponding to the subscriber may be applied to the data bit group to provide the desired services.

75 Claims, 5 Drawing Sheets

| Src | Dst | Svc | Action | |
|---|---|---|---|---|
| SubsA or Office 1 | Office 1 or SubsA | imap | Accept, Encrypt 3xDES | ~510 |
| SubsA or Other Offices | Other Offices or SubsA | http, smtp, telnet | Accept, Encrypt DES | ~520 |
| Any | SubsA-Web-Srvr | http | Accept | ~530 |
| Any | SubsA-Mail-Srvr | smtp | Accept | ~540 |
| SubsA-subnets | Any | Any | Accept | ~550 |
| Any | Any | Any | Drop & log | ~560 |

*FIG. 5A*

| Src | Dst | Svc | Time | TOS | Where | LineCond. | Action | |
|---|---|---|---|---|---|---|---|---|
| Any | Any | Any | Any | Any | SubsAlink-In | Peak<1Mbps Sust.<500K | TOS=same | ~580 |
| Any | Any | Any | Any | Any | SubsAlink-In | Any | TOS=TOS-3 | ~590 |

*FIG. 5B*

SYSTEM AND METHOD FOR PROVIDING DESIRED SERVICE POLICIES TO SUBSCRIBERS ACCESSING THE INTERNET

CROSS-REFERENCES TO RELATED APPLICATIONS

This is a continuation of U.S. patent application (application Ser. No. 09/205,041) filed Dec. 3, 1998 which has now matured to U.S. Pat. No. 6,466,976 B1.

BACKGROUND OF THE INVENTION

1. Field of the Invention

The present invention relates generally to digital communication networks, and more specifically to a system and method for providing desired service policies to subscribers accessing the Internet.

2. Related Art

Users often access remote systems using local systems. In a typical scenario, a user may use a computer system (generally located close-by) to access a remote system (generally at a distant location). The access can serve as a basis for several useful applications such as web browsing, electronic mail and data base accesses as is well known in the relevant arts.

Remote access devices often exist between local systems and remote systems. A remote access device generally operates as an aggregator (concentrator) or multiplexor of physical connections (e.g., dialed connections over local loops and dedicated Ti lines from large groups) originating from users. The remote access devices generally operate to send digital data bits ("bit groups") destined for the users, and receive bit groups originating from the users. Remote access servers (supporting digital and/or digital modems) provided by internet service providers (ISPs), digital subscriber line access multiplexors (DSLAMs) provided by local exchange carriers (conventional and competitive LECs), and cable modems provided by cable television providers are examples of such remote access devices.

A remote access device commonly interfaces with a data switch, which selectively forwards each received bit group to a corresponding destination, typically based on address information encoded in the bit groups. In a common implementation, a data switch corresponds to an Internet Protocol (IP) router, which examines the destination address of an IP packet to determine the next point (typically another router or computer system) to send the IP packet to.

In a conventional implementation, combination of routers and remote access devices may not serve particularized requirements (or desired service policies) of users. A group of users having specific service policy requirements will be referred to as a subscriber in the present application. Examples of particularized requirements of subscribers are first noted. Then, the inadequacy of conventional routers and remote access devices in meeting user requirements is described.

Subscribers may have particularized requirements for several reasons. For example, some a subscriber containing a large group such as a business, and the business may wish to limit the aggregate bandwidth used by some or all of the users. Some other business may wish a virtual private network (VPN), having dedicated secure links between different distance locations perhaps for some users but not all. Yet another business may wish to restrict inbound access to certain types of applications (e.g., only web accesses, but not file transfers or telenet) or have different classes of service (COS's) for different applications.

On top of such requirements for large groups, individual users (subscribers) may have different requirements. These individuals may be part of a large business or home users. A user may wish to be allocated only 56 Kbps during some peak times (e.g., business hours when networks are typically more congested), and much higher bandwidth during other times. An ISP may wish to charge lower rates for such users. In general, it should be appreciated that the users or subscribers can have varying and particularized service policy requirements.

Conventional combinations of data switches and remote access devices may be inadequate in serving a combination of such requirements for several reasons. For example, data switches may be implemented primarily as fast packet forwarding devices, albeit with limited prioritization and access control schemes. Asynchronous transfer mode (ATM) switches prioritizing traffic based on quality of service (QoS) and traffic parameters, and IP routers filtering data of only some applications are illustrative examples.

However, the architectures chosen for conventional data switches and/or remote access devices may not provide for customization of service policies for individual users/subscribers. For example, ATM switches forwarding cells may not have the ability to distinguish between individual users by the examination of a single cell. Data switches operating at higher layers (e.g., IP routers) may be designed to process packets uniformly, usually for attaining speed, and thus may not be designed to provide customized service policies to individual subscribers.

As noted above, such customization may be required in several instances. Therefore, what is needed is a flexible architecture which enables the provision of different customized service policies to different subscribers.

In addition to customization, it is generally necessary that the architecture scale to serve a large number of subscribers. Therefore, what is also needed is a flexible architecture which scales well to serve a large number of subscribers.

SUMMARY OF THE INVENTION

The present invention is related to an internet service node (ISN) which provides a desired set of service policies to each subscriber. The ISN is particularly useful for remote access providers such as ISPs and LECs (both incumbent and competitive). The access providers may use the ISN as edge an device in the path of subscriber applications data flows and provide customized service policies to each subscriber.

In accordance with the present invention, a customized set of service policies can be specified for each subscriber. The service policies of a subscriber are translated into a set of processing rules, with each processing rule containing a classifier and an associated action. The classifier generally specifies the data flow(s) and any conditions under which the action can be applied to a set of data bits transferred on the data flow(s). In the internet protocol (IP) environment, the source/destination IP addresses, source/destination ports and the protocol type field together generally define an IP data flow supporting a specific remote access application.

Conditions may include matching of a specific variable defining the service policy. For example, a service policy may specify that data bits be treated a specific way between 9 PM-5PM, in which case TIME is a variable and the condition is TIME=9 PM-5 PM. As another example, data bits for a subscriber may be given lower priority if the aggregate bandwidth used by the subscriber is greater than T1, in which case BANDWIDTH is the variable and the condition is BANDWIDTH>T1.

Typically, most processing rules can be constructed statically from the specified service policies. However, some processing rules may need to be instantiated dynamically upon the occurrence of a specific event. For example, the IP address of a subscriber dialing-in to and relying on the access network for allocation of IP address, may not be available up-front. Accordingly, the ISN constructs the processing rules when the subscriber is allocated an IP address after successfully dialing in.

Thus, the ability of the present invention to dynamically instantiate processing rules enables an ISN to serve subscribers who may asynchronously access an access network, provides the ISN the ability to provide customized service policies to such subscribers also. In addition, as an ISN need not be configured with processing rules for inactive (i.e., not logged on) subscribers, the ISN may be used for serving a large number of subscribers.

As another example of dynamic instantiation of processing rules, in RealAudio type applications, new TCP (or UDP) connections may be initiated in the middle of an application session, and the new connections may have port numbers which cannot be determined beforehand. The port numbers are typically negotiated using control flows as is well known in the relevant arts. The ISN may be designed to examine packets in control flows and determine the required information, and construct new processing rules once the information is available.

An embodiment of ISN includes a plurality of processor groups, with each processor group again containing multiple processors. All flows for a subscriber may be dedicated for initial processing by one of the processor groups. When ATM cells are used as data bit groups, the channel identifiers can be used for assignment to individual processor group. Packets may be assigned to individual processors within a group in a weighted round-robin fashion for load balancing. Other resource allocation schemes or management policies can be used as well.

The processors processing the packets (to provide the desired services) may be provided as physical units separated from the access and trunk ports. The physical separation enables the number of processors and ports to be changed (increased or decreased) independent of each other. The resulting flexibility enables an architecture in accordance with the present invention to scale well to support a large number of subscribers.

Therefore, the present invention enables desired service policies for individual subscribers by providing separate processing rules for each subscriber, and using the processing rules to process data bits received on different data flows from the subscribers.

The present invention is particularly suitable for remote access applications as an ISN can be provided as an edge device, which can control all application data flows to provide desired service policies for each using subscriber using a single ISN.

The present invention provides for easier management and lower cost of subscriber devices as the desired service policies can be implemented by a remote access service provider (without requiring intelligent device at the subscriber premises).

The present invention enables multiple subscribers to share the same ISN as the service policies of one subscriber may not generally affect the other subscribers.

The present invention is particularly useful for remote access providers serving subscribers who access remote access networks by dialing-in (or other asynchronous mechanism) as the subscriber policies can be dynamically added to the ISN for the subscribers.

The present invention enables a large number of subscribers to be served as the processing rules of subscribers can be instantiated dynamically and the ISN needs to be configured with the processing rules of only the active subscribers.

The present invention enables an ISN to scale well to serve a large number of subscribers as the number of processors can be increased and the computation load of processing packets can be distributed among the processors.

The present invention provides a flexible architecture to serve a large number of subscribers as the processors are physically separated from the ports used for transmission and reception of data, and as the number of processors can be change independent of the number of ports, and vice versa.

Further features and advantages of the invention, as well as the structure and operation of various embodiments of the invention, are described in detail below with reference to the accompanying drawings. In the drawings, like reference numbers generally indicate identical, functionally similar, and/or structurally similar elements. The drawing in which an element first appears is indicated by the leftmost digit(s) in the corresponding reference number.

BRIEF DESCRIPTION OF THE DRAWINGS

The present invention will be described with reference to the accompanying drawings, wherein:

FIG. 5 is a table illustrating example processing rules providing desired service policies for a subscriber.

DETAILED DESCRIPTION OF THE PREFERRED EMBODIMENTS

Figure 1:
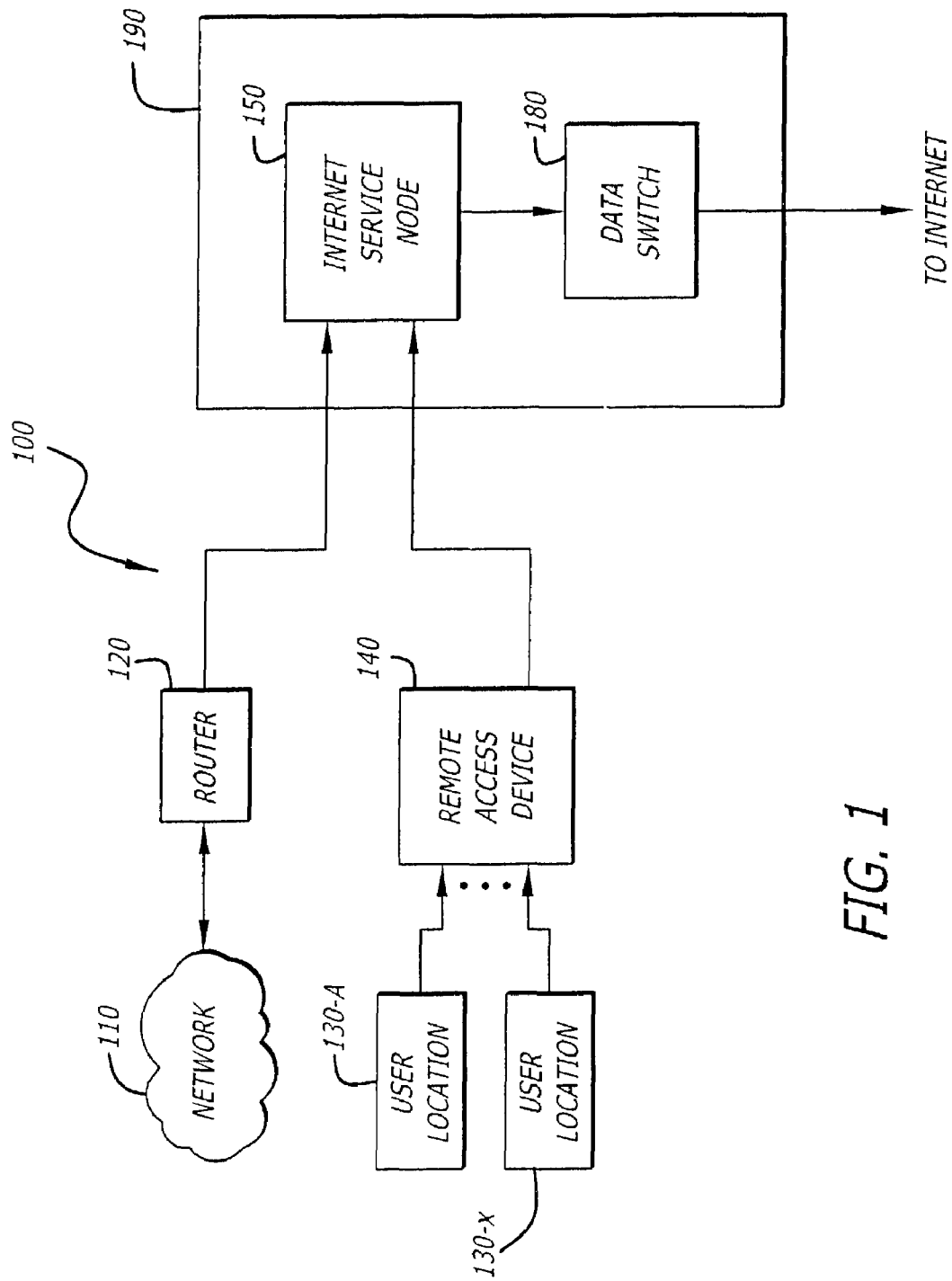
FIG. 1 is a block diagram of a telecommunication system illustrating an example environment in which the present invention can be implemented.

1. Overview and Discussion of the Present Invention

An internet service node (ISN) provided in accordance with the present invention enables customized service policies to be provided to individual users or subscribers. The service policies are translated into processing rules, with each processing rule containing a classifier and an associated action. The classifier generally specifies the data bits (of the subscriber) to which the action is to be applied.

The processing rules may be applied at higher protocol layers (e.g., at network layer and above in the TCP/IP model), where subscriber data can be examined for match with processing rule classifiers. The bit groups at the higher layers may be termed as packets. The packets may be made of bits from one or more bit groups such as frames in frame relay or cells in ATM technology.

As data for a subscriber is processed according to the processing rules specific to the subscriber, each subscribed can be provided an individualized service policies set.

The present invention can be appreciated well by considering the manner in which bit group formats are typically used to support an application for remote access. The manner in which embodiments of the present invention can take advantage of typical formats will be illustrated then.

2. Bit Groups

A bit group generally refers to a number of bits identifiable as a group. Different bit group formats may be used depending on the protocols to support different access methods. Multiple bit groups may form another bit group according to pre-specified conventions as is well known the relevant arts. As an example, data in several ATM cells may form an IP packet.

For purposes of illustration, the present invention is described substantially in the context of internet protocol (IP) packets transported as ATM cells. However, it should be understood that the present invention can be implemented with other protocols and transports as will be apparent to one skilled in the relevant arts. Such other implementations are contemplated to be within the scope and spirit of the present invention.

Each ATM cell contains 53 bytes of data, of which 5 bytes are used as header and 48 bytes are used as payload (actual application data using ATM networks). The header contains virtual path identifier (VPI) and virtual channel identifier (VCI) fields, which defines a channel. The next node in the connection path is typically defined when the channel is setup by a suitable signaling scheme. For a detailed understanding of ATM, the reader is referred to a book entitled, "ATM: Theory and Application", (ISBN: 0070603626, Published September 1994 by McGraw-Hill Series on Computer Communications), by David E. McDysan and Darren L. Spohn, which is incorporated in its entirety herewith.

In general, individual ATM cells do not contain the information necessary to identify the associated subscriber accurately for providing customized service policies. As should be understood, an ISN may thus need to examine the higher level protocols to determine the subscriber service policies according to which the cells may need to be processed.

Accordingly, the payload of the ATM cells may be assembled to form a packet of the higher level protocol (IP protocol in our example). The assembled packet may then be examined to determine the subscriber to which the data relates to, and the processing rules specific to the subscriber are applied to the packet. The considerations in the examination of the higher protocol packets are described below with reference to IP environment.

3. Identifying Subscribers and Related Protocol (IP) Packets

The manner in which service policies can be associated with packets related to individual subscribers will be apparent by understanding the manner in which packets relate to remote access applications as described below.

Each typical remote access application requires a connection containing data flows in at least two directions. A data flow commonly refers to a sequence of IP packets from a source system to a destination system for supporting an application. In the IP environment, applications are typically identified by TCP or UDP ports, which are generally pre-specified or negotiated to identify the relationship with an application. Source and destination port numbers are typically used. The protocol type (TCP, UDP or ICMP), the port numbers along with the source and destination IP addresses, define an IP flow.

Some application-specific sessions employ more than the two flows, and possibly multiple connections. All flows related to an application session define a conversation. In IP environment, conversations are generally implemented on top of TCP (transmission control protocol), UDP (user datagram protocol), and ICMP (Internet control message protocol) protocols as is well known in the relevant arts. A conversation may contain multiple data flows depending on the application. For example, applications such as file transfer protocol (FTP) and RealAudio employ multiple flows, some times using a combination of higher layers (e.g., TCP vs. UDP in the IP fields).

TCP is the most common high level transport used by applications as TCP provides reliable stream of data using potentially unreliable IP packet transfer. A TCP connection generally contains two data flows, with the port numbers and IP addresses reversed. For example, assuming N1, N2, N3 and N4 respectively refer to the source IP address, source port number, destination IP address and destination port number for a data flow in one direction, the data flow in the other direction will have N2, N1, N4 and N3 for the same variables respectively. Multiple TCP connections may be used to implement an application.

In the case of UDP, the source ports generally are unpredictable when examined in the path between the two end systems. In the case of ICMP, the ports are replaced by type and identification fields.

From the above, it should be appreciated that each flow can be uniquely identified by the examination of the IP packet content. In addition, many types of applications use pre-specified port numbers (e.g., SMTP mail uses port 25), which can be used to identify the specific user applications if the processing rules are specified per user application.

In some instances, the port numbers used for flows in a conversation may be determined based on negotiations conducted on a 'control flow', typically setup on a pre-specified well-known port. For example, in multi-media (containing a combination of text, voice and video) application, multiple flows may be used for transferring digital data related to each multi-media component. A control connection is first initiated on a pre-defined port (e.g., port 200), and the ports for remaining flows are determined based on packet flows on the control connection. The port numbers for these new flows is encoded according to a pre-specified convention as is well known in the relevant arts.

Using at least the general formats and protocols illustrated above, an ISN may be implemented to provide desired service policies to each subscribers as described below in further detail. For illustration, an example environment in which the present invention can be implemented is described first. Example embodiments of the present invention are then described.

4. Example Environment

FIG. 1 is a diagram illustrating an example telecommunication environment 100 in which the present invention can be implemented. The Figure illustrates different user (subscriber) locations (110, 130-A and 130-X) interfacing with internet service node (ISN) 150 using different access technologies. ISN 150 is provided in access network 190. ISN 150 enables different desired service policies to be provided to different users in accordance with the present invention.

User network 110 may contain several systems connecting to router 120. User network 110 may be viewed as containing one subscriber or multiple subscribers. Router 120 may transfer data to ISN 150 as IP packets using protocols such as serial line interface protocols (SLIP) or point-to-point protocol (PPP). User location 130-A and user location 130-X are shown connected to remote access device 140, which may correspond to a remote access server (supporting analog and/or digital modems) or DSLAM implemented in a known way. Remote access device 140 may transfer data as IP packets segmented into ATM cells. Each location 130 may contain a single or multiple subscribers as described below.

It should be understood that the interfaces and subscriber locations of FIG. 1 are merely examples. ISN 150 may interface with different subscriber locations using different media and technologies without departing from the scope and spirit of the present invention as will be apparent to one skilled in the relevant arts. Such other implementations are contemplated to be within the scope and spirit of the present invention.

ISN 150 processes the data received (on various interfaces) in accordance with the present invention to provide desired service policies to different subscribers. Even though not shown, remote access device 140 may also be considered part of access network 190. Also, ISN 150 may interface directly with the Internet instead of relying on data switch 180. In general, data switch 180 may be needed if ISN 150 is not implemented including routing functionality.

The desired service policies are specified by or translated into processing rules, which indicate the manner in which data corresponding to different subscriber applications needs to be processed. To enable different bit groups to be correlated with different applications, ISN 150 may combine the bit groups into packets containing the necessary information. The processing rules are then applied to packets to provide the desired service policies. Data switch 180 may receive bit groups from ISN 150 and interface with other external systems in the Internet. Data switch 180 may correspond to an IP router, ATM or frame relay switch according to a pre-specified design.

As also shown in FIG. 1, ISN 150 has particular application for remote access service providers such as ISPs and LECs (incumbent or competitive). Because of the ability to provide desired service policies to various subscribers, ISN 150 of the present invention may be placed at the edge (i.e., interfacing with subscriber equipment) of remote access network 190. In such a case, ISN 150 may be referred to as an edge device, ingress/egress router or gateway.

As will be apparent from the description below, using ISN 150 at the edge enables subscriber equipment (e.g., router 120) to be implemented with less complexity, and thus to provide easier management and lower cost. Such a feature is particularly important for ISPs and LECs. Accordingly, FIG. 2 illustrates the manner in which the desired service policies can be provided to each subscriber.

5. Method of Providing Desired Service Policies to Subscribers

Figure 2:
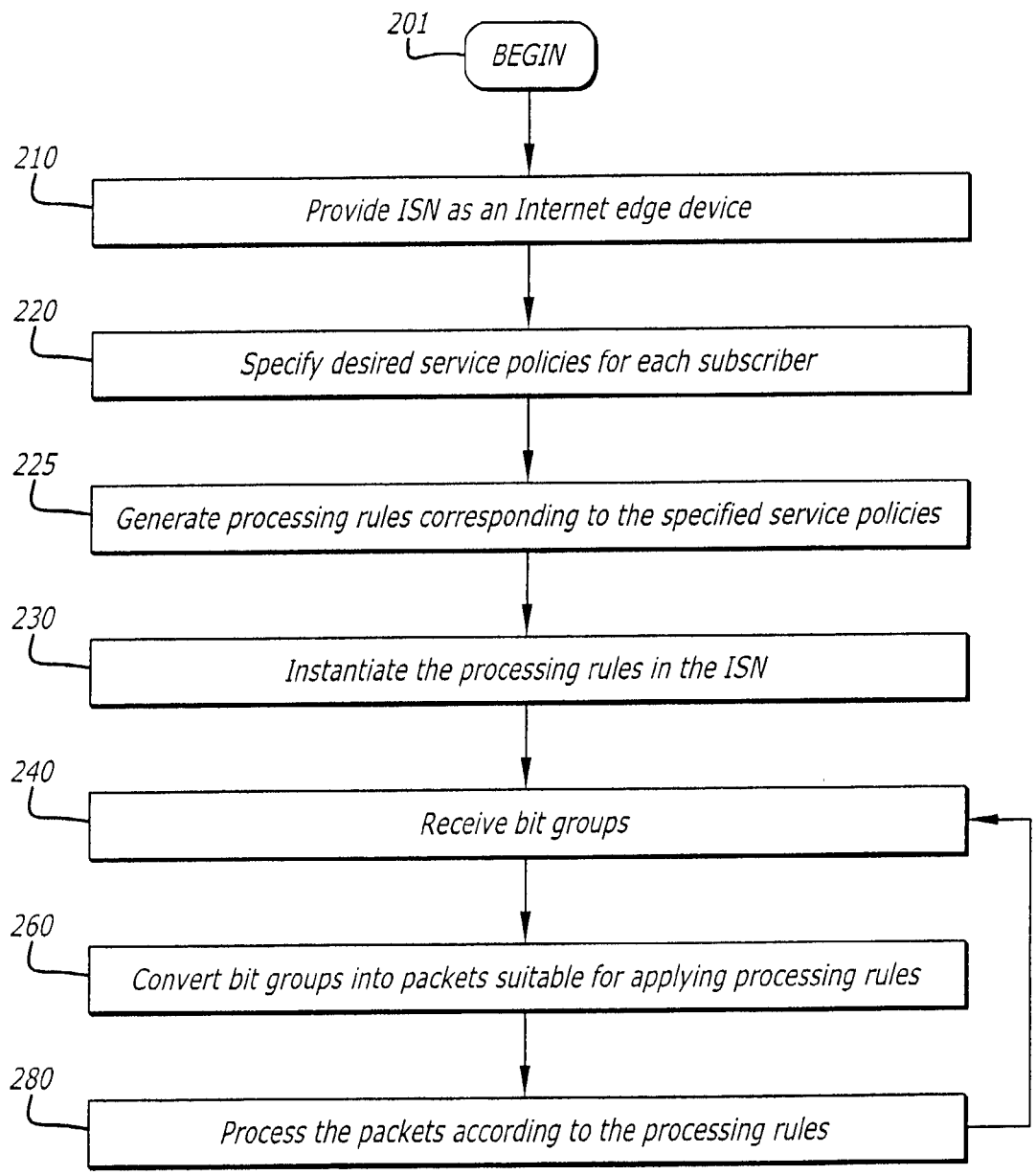
FIG. 2 is a flow-chart illustrating a method in accordance with the present invention.

FIG. 2 is a flow chart illustrating the manner in which the desired service policies can be provided for each subscriber in accordance with the present invention. In step 210, ISN 150 of the present invention is provided as an edge device in the access network. ISN 150 is preferably implemented as an IP router because of the wide-use of IP protocol by various systems.

In step 220, different service policies may be specified for each subscriber. The service policies may specify, for example, the aggregate bandwidth which can be used by a subscriber or some of the systems used by the subscriber, firewall parameters (which applications/IP addresses are permitted out/in), security (anti-spoofing, virtual private network with encryption and tunneling) for specified conversations, priority in usage of buffer and bandwidth (e.g., higher priority to interactive applications such as telenet), traffic steering, etc. Examples of specifying the service policies are described below in further detail.

In step 225, processing rules corresponding to the service policies may be generated. Each processing rule contains a classifier and associated action. The classifier specifies all the data flows and any conditions under which the associated action needs to be applied to the data on the data flows. In the IP environment, each data flow in turn may be uniquely identified by the protocol type, source/destination IP addresses and (TCP/UDP) source/destination ports. A classifier may specify multiple data flows.

Conditions may be specific to the type of service policy being implemented. For example, a subscriber may be permitted higher bandwidth during non-business hours. Another subscriber may have the data being given a lower priority if the data is destined to a specific subscriber during a specified time of day. Examples of the conditions are described in further detail below with reference to FIG. 5B.

Many processing rules may be generated up-front when the service policies are specified. However, for some processing rules, the necessary information may not be available up-front. In such a situation, rules are generated dynamically when the information is available. Some example scenarios for dynamic generation of processing rules are noted below.

One example scenario requiring dynamic generation of rules is when a subscribers uses a dial-up connection with access network 190 and relies on access network 190 to, assign an IP address. For example, with respect to FIG. 1, user location 130-A may correspond to a personal computer using a modem. The IP address for a machine at user location 130-A may be assigned by an authentication-authorization-access (AAA) server (not shown in the Figures) when a user establishes a dial-up connection as is well known in the relevant arts. Assuming that the processing rules require an allocated IP address, the processing rule may be generated only after allocation of the IP address.

As another example, in the case of some applications, the data flows may be initiated in the middle of an application session, and the port information may be available only after the corresponding data flow is initiated. The port information is typically determined during negotiation between the two end systems, and the port information is generally contained in the packets serving as a basis for the negotiation.

Accordingly, ISN 150 may have to monitor the packets on some flows to determine the port number of other flows. ISN 150 may then use the determined information to generate the processing rules with classifiers and associated action.

In step 230, the processing rules are instantiated in ISN 150. Instantiation generally refers to making the processing rule active by proper configuration of ISN 150. Once instantiated, ISN 150 applies the processing rules to the corresponding subscriber data as described below in further detail.

It may be noted that some of the processing rules may be instantiated up-front, for example, at the earlier of when ISN 150 boots up or when the desired services are specified.

Some other processing rules may be instantiated when generated as described above in step 225.

In step 240, ISN 150 may receive bit groups according to the specific interface provided to the subscriber equipment. In step 260, the bit groups are converted into packets suitable for applying processing rules. If the bit group contains sufficient data for applying processing rules, the bit group itself may be treated as a packet without conversion. For example, the bit groups correspond to a complete IP packet without fragmentation, no assembling may need to be performed. If the bit group is an ATM cell, payload of multiple cells may be combined (assembled) to form an IP packet.

Sometimes the data in multiple IP packets may in turn need to be combined into a single packet, typically when the IP packet is fragmented. Fragmentation may be performed, for example, to make individual IP packets size small to conform to maximum packet size allowed by an intermediate network in the connection path. The combined packet will also be referred to as a packet. In general, bit groups may be assembled multiple levels to determine whether subscriber data (received in the form of bit groups) matches a classifier.

In step 280, the packets are processed according to the processing rules provided per subscriber. That is, each packet is first associated with a subscriber, and the processing rules corresponding to the subscriber are applied. As is well known in the relevant arts, an IP address may be shared by multiple machines during remote access. Accordingly, the virtual channel number (e.g., VCI/VPI combination in ATM, DLCI in frame relay) may first identify a subscriber, and the processing rules associated with the subscriber may be applied to the packets received or sent on the channel.

Multiple subscribers may share a single channel identifier in some situations. For example, when a sub-group of network 110 is viewed as a subscriber, the subscribers of network 110 may share a single channel. In such a case, the IP addresses may be designed to be non-overlapping so that different flows are uniquely associated with different subscribers. Similarly, ISN 150 may receive packets destined for subscribers on a single channel. In such a situation, ISN 150 may need to example the IP addresses and other information to associate a packet with a subscriber.

The processing rules may need to be applied in one of several possible orders to ensure predictable and desired service policies. In general, the processing determines whether/where/how and at what priority to forward the packet. To implement the processing rules, several 'states' may need to be maintained in ISN 150. For example, if a pre-determined aggregate bandwidth is allocated to multiple flows, the number of bits transferred for the multiple flows may need to be maintained for limiting the overall bandwidth. The data in the packet generally needs to be forwarded according to the interface provided with the next system in the connection path.

Thus, by applying the processing rules to different packets, the desired service features may be provided to each subscriber. The method of FIG. 2 may be implemented in several ISNs. An embodiment of ISN 150 is described below in further detail.

6. Internet Service Node

Figure 3:
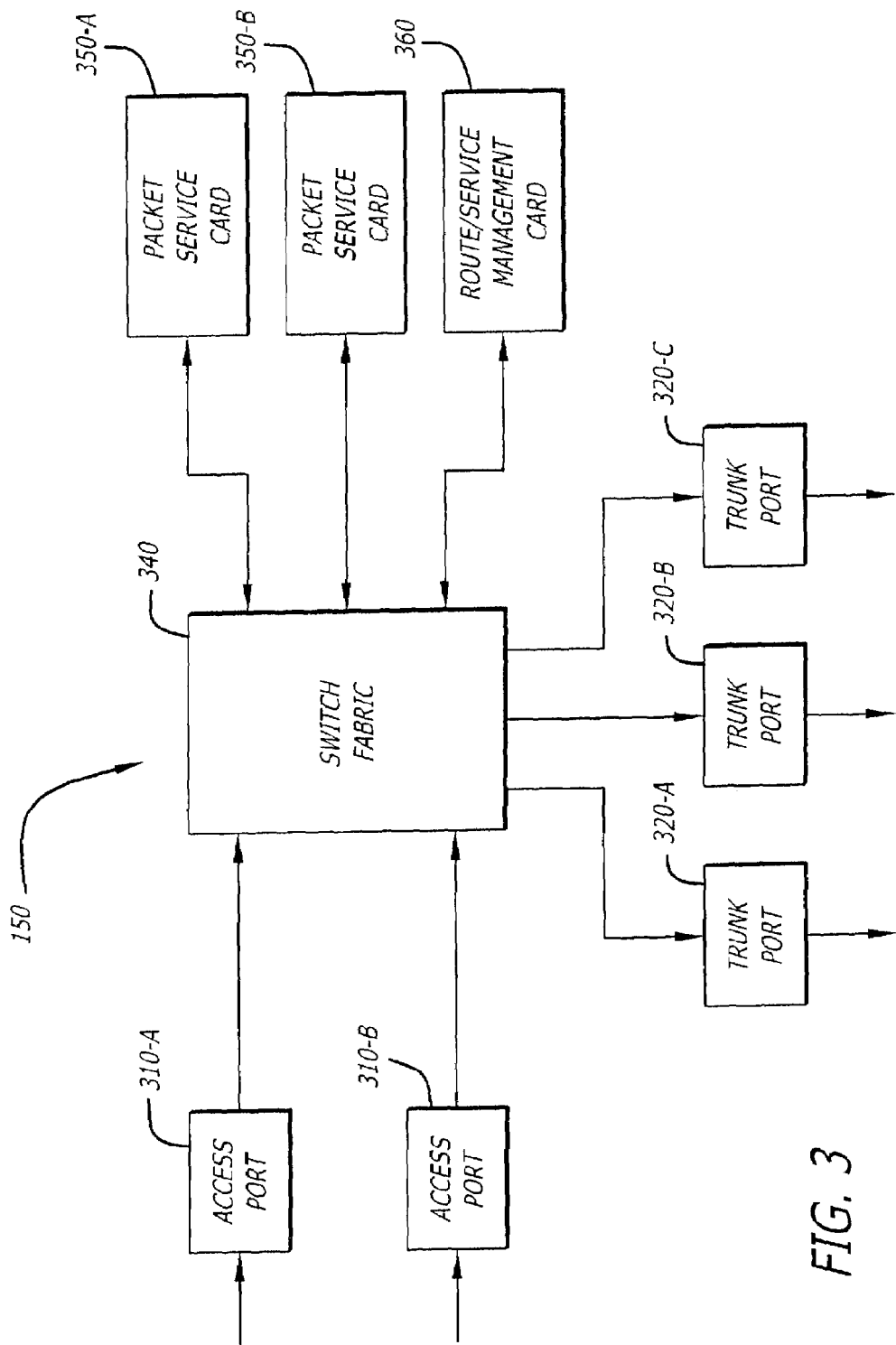
FIG. 3 is a block diagram of an embodiment of internet service node (ISN) provided in accordance with the present invention.

FIG. 3 is a block diagram illustrating the details of ISN 150 in one embodiment. ISN 150 may include access ports (310-A and 310-B), trunk ports (320-A, 320-B and 320-C), switch fabric 340, packet service cards 350-A and 350-B, and route management card 360. Trunk ports 320-A, 320-B and 320-C will be collectively or individually referred to by 320 as will be clear from the context. Similar convention is used with reference to other components described in the present application.

It may be noted that packet service cards 350 are physically separated from ports 310 and 320. The physical separation enables the number of packet service cards 350 to be changed independent of the number of ports 310 and 320, and vice versa. Such a flexibility enables the ISN 150 to scale well to serve a large number of subscribers.

Access ports 310 provide the necessary physical interface to receive and send bit groups in a pre-specified format. Protocols such as Sonet may be used for high speed interface. For purposes of illustration, access ports 310 will be assumed to send and receive data in the form of ATM cells. Each subscriber port 310 forwards the ATM cells to switch fabric 340.

Trunk ports 320 provide high speed access lines for internet access to subscribers. Trunk ports 320 receive ATM cells (or other bit groups) from switch fabric 340, and forwards the cells on the corresponding lines as specified by the channel identifier (or other destination address). Similarly, trunk ports 320 may receive data bit groups in the form of ATM cells or IP packets from the Internet and send the data bit groups to switch fabric 340. In this reception scenario, higher level protocol information (e.g., IP header) may need to be examined to determine the subscriber associated with the received data bits. The determination may form the basis for allocation of the data bits to a specific processor group for further processing.

In an embodiment, multiple ports are provided on a line card and each port can be configured either as a trunk port or access port. The line cards can support different access technologies such as frame relay, ATM, packet over Sonet, Fast Ethernet, Gigabit Ethernet.

Route/service management card (RMC) 360 executes routing protocols such as Open Shortest Path First (OSPF), RIP, or BGP to determine the next hop (or forwarding information in general) for each IP packet. The routing protocols can be executed in known way. RMC 360 may provide forwarding information in the form of VCI/VPI information to identify the next hop of the IP packet.

Switch fabric 340 receives bits groups from access ports 310, and forwards the received bit groups to packet service cards 350 upon receiving the data for an entire packet. If the data bits are received as ATM cells, the last cell for a packet may be determined according to AAL5 protocol well known in the relevant arts. Thus, all the cells forming a frame may be sent to an appropriate packet service card 350 once the data for a packet is available. Different service policy types may be implemented in different packet service cards 350. Accordingly, each subscriber (using the connection or subscriber identifier) may be assigned to a packet service card providing the desired service policy types.

To determine the appropriate packet service card, switch fabric 340 may maintain a channel identifier associated with each channel on which the bit groups are received. In case of ATM cells, the VCI/VPI information in the bit groups uniquely defines such a channel. The physical port number (on which the data is received) and channel identifier may uniquely identify each subscriber (or a group of subscribers with non-overlapping IP addresses) when data is directly received from a subscriber and destined for the Internet. On the other hand, when data is received from the Internet, the determination of the associated subscriber may require examination of the IP header. In general, switch fabric 340 may buffer the cells until a last cell of a packet is received, and forwards all the cells for the packet to a packet service card allocated for an individual subscriber.

Switch fabric 340 may receive bit groups (cells) from packet service cards 350, and send the cells on one of the trunk ports 320. The specific trunk port 320 may be determined by associating a specific trunk line card 320 for each channel, which may also be identified by a channel identifier provided by packet service cards 350.

Packet service card 350 may process the received cells according to processing rules to provide the desired service policies to each specific subscriber. Packet service card 350 first assembles the cell data into packets which can be identified with flow used in classifiers, and applies the processing rules. In the process, packet service card 350 determines whether to discard or forward the packet. The IP destination address may also be changed if transparent forwarding is a requested service for that system.

Packet service card 350 may determine the next hop for the packet based on the routing information provided by route management card 360 or the channel identifier associated with the incoming cells. A new VCI/VPI number is generated according to the next hop for all the cells to be generated from the processed packet. Packet service card 350 sends the cells with the new VCI/VPI number to switch fabric 340 for forwarding on appropriate trunk port 320.

By applying the processing rules to each packet, packet service card 350 may enable ISN 150 to provide several features in accordance with the present invention. Several embodiments of packet service card 350 may be implemented without departing from the scope and spirit of the present invention. An example implementation is described below.

7. Packet Service Card

Figure 4:
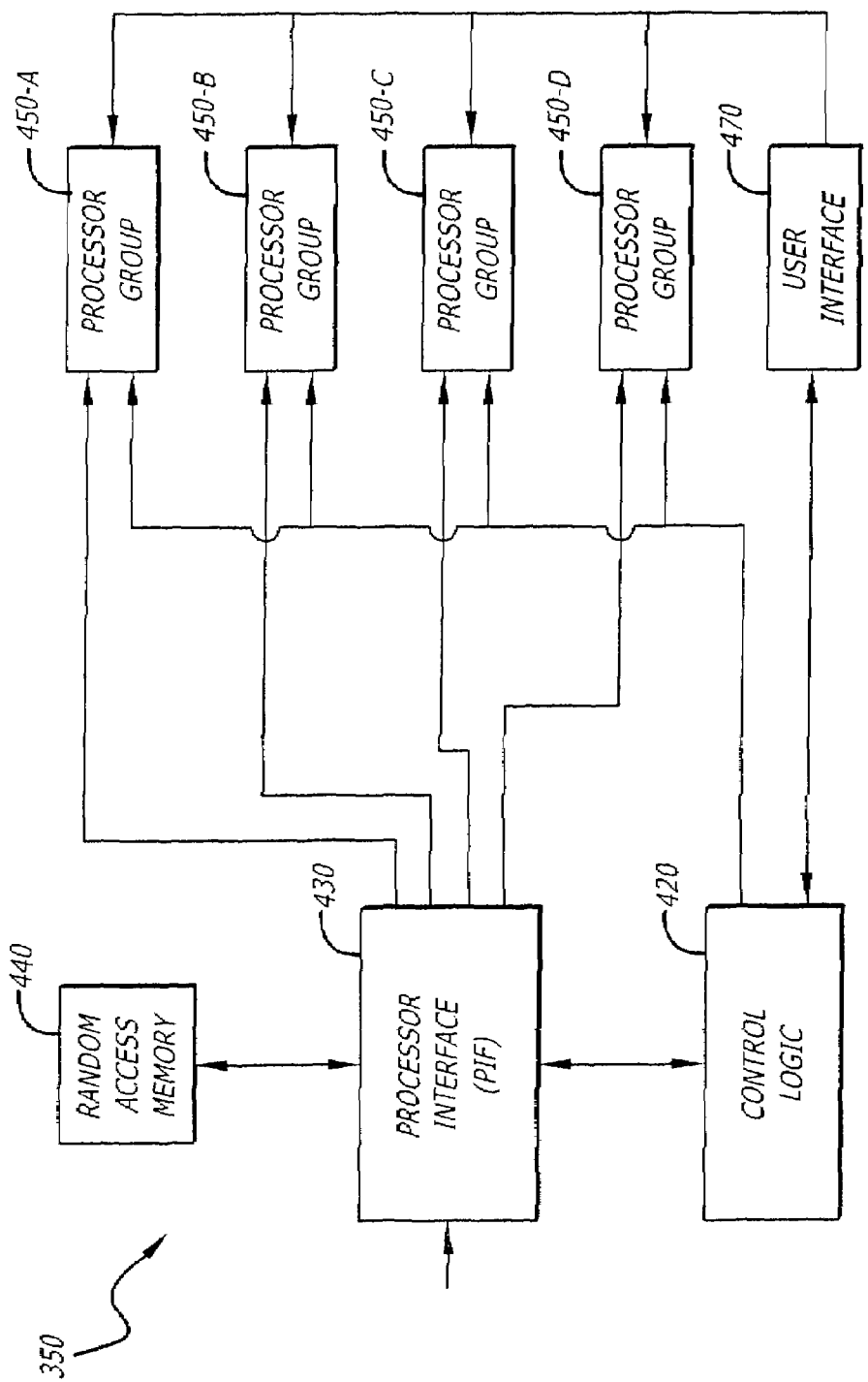
FIG. 4 is a block diagram of an embodiment of packet service card provided in an ISN in accordance with the present invention.

FIG. 4 is a block diagram illustrating the details of an embodiment of packet service card 350. Packet service card 350 may contain four processor groups (450-A through 450-D), random access memory (RAM) 440, processor interface (PIF) 430, control logic 420, and user interface 470. Control logic 420 controls and coordinates the operation of the remaining components. The manner in which other blocks may operate is described below in further detail.

PIF 430 receives cells from switch fabric 340 and stores the cells in random access memory (RAM) 440. RAM 440 generally needs to permit fast access, and is implemented as SyncSRAM of 16 MB in an embodiment. PIF 430 strips cell header from the cells and provides the cell data in the form of a packet to one of the four processor groups 450. The specific processor group 450 may also determined by the connection identifier determined from the cell header data.

Control logic 420 may determine which of the processors in a processor group may process a packet. In an embodiment, packets are assigned on a round robin basis among the four processors. The manner in which a processor may process a packet according to the processing rules is described below with reference to FIGS. 5A and 5B.

User interface 470 provides a convenient interface for a user to provide the service requirements for each user. In an embodiment, user interface 470 is implemented as a separate computer system, which interacts with ISN 150 according to a pre-specified protocol. In an alternative embodiment, user interface 470 may be integrated into ISN 150. In general, user interface 470 needs to enable an access provider to specify desired service policies for each subscriber.

User interface 470 preferably translates the service policies into processing rules when the information is available, and provides the processing rules to control logic 420. Control logic 420 instantiates the rules by first assigning the subscriber to a processor group 450, and then configuring the processor group with the processing rule.

User interface 470 may interact with a authorization-authentication-access (AAA) server to determine when an IP address is allocated to a subscriber accessing the access network by a dial-in connection, and provides the processing rules corresponding to the subscriber to control logic 420. In response, control logic 420 instantiates the processing rules by configuring a processor group 450 appropriately.

Each processor group 450 may contain multiple processors for fast processing of the packets. While a processor group is determined by the channel identifier associated with the cells, the specific processor processing the packet may be determined by control logic 420. When implementation of a service policy requires dynamic instantiation of a processing rule based on examination of data transferred in the data flows, processor group 450 may examine the data flows and generate new processing rules.

As an illustration, in H.323, voice-over-IP, or streaming applications, new connections or data flows may be dynamically created based on negotiations implemented in control flows. Processor group 450 may examine the control flows to determine any necessary information (e.g., port numbers) and create processing rules based on the examination. Control logic 420 may configure processor group 450 to ensure processor group 450 performs such an operation. In turn, control logic 520 may be controlled due to a service policy specified using user interface 470.

Thus, ISN 150 in accordance with the present invention may generate processing rules specific to each subscriber based on desired service policies. By applying the service policies only the corresponding subscriber data, the desired service policies may be achieved. The operation ISN 150 is further illustrated with respect to some examples.

8. Processing Packets

FIGS. 5A and 5B together illustrate subscriber policies for a subscriber using some examples. For illustration, the packets are described as being processed according to a first match policy. However, other matching policies such as 'best match' may be used as will be apparent to one skilled in the relevant arts.

FIG. 5A illustrates how different policy rules can be specified to implement security. It is first noted that the classifier for security policy is chosen to merely include data required for identifying flows (no conditions). Service rule 510 specifies a classier of IP address=SubsA or Office1, destination IP address=SubsA or Office1, service=IMAP, and an action to encrypt matching data using 3×DES encryption protocol. That is, the mail exchanges between SubsA and Office1 are to be encrypted using the specified protocol.

Two processing rules may be generated to implement service rule 510, with each rule having a classifier specifying one flow. In general, each processing rule may be generated as a five tuple with source IP address, destination IP address, protocol field (e.g., TCP or UDP), source port number, and destination port number.

At least some of the service rule parameters are readily available up-front and can thus be statically translated into corresponding processing rule parameters. Thus, assuming the IP addresses SubsA and Office1 of service rule 510 are known beforehand, two processing rules may be generated from the service rule as the TCP port number for IMAP is pre-specified.

However, if one of the IP addresses (e.g., SubsA) is to be generated dynamically, for example as the user system needs to establish a dial-in connection, user interface 470 may dynamically generate the processing rules after the user is assigned an IP address. The processing rule may also be instantiated dynamically.

Service rule 520 attempts to accept and encrypt all HTTP, SMTP, and TELNET traffic from and to SubsA. Processing rule(s) may be generated for each of HTTP, SMTP, and TELNET. The protocol types and port numbers for these three applications are pre-specified, and accordingly processing rules may be generated statically assuming the IP addresses (for SubsA and other offices) are also known.

Service rule 530 accepts all HTTP traffic to SubsA-Web-Srvr. Service rule 540 accepts all smtp traffic with SubsA-Mail-Srvr. Service rule 550 accepts all traffic from SubsA-Subsets. Service rule 560 drops (discards) all other data and makes a log of the dropped data for later accounting and analysis. As may be readily appreciated, the approach of FIG. 5A can be used to implement security requirements specific to a subscriber. Different subscribers may have different policy rules to suit their individual needs.

In the approach of FIG. 5A, each classifier generally includes information necessary to identify flows. Classifier may include conditions specific to service policy as illustrated with reference to FIG. 5B, which illustrates service policy rules for policing in an embodiment. Policing generally refers to prioritization and allocation of bandwidth to different connection sharing available bandwidth.

Service rule 580 specifies that if the data is being received on SubsAlink-In at an aggregate bandwidth less than 1 Mbps and a sustained bandwidth of less than 500 Kbps, the data has to be re-transmitted with the type of service (TOS). Sustained bandwidth and aggregate bandwidth can be measured according to one of several known ways. The classifier specifies that the rule is applicable at any time of day and for all TOS. TOS, Time, Where and LineCond are examples of conditions for the policing service policy.

Service rule 580 decreases the priority of the data if the line conditions of service rule 580 are violated. As ISN 150 of the above-described embodiments regenerates data bit groups prior to sending on trunk ports 320, the TOS values can be decremented in a known way.

Using at least the above-described embodiments, particularized service policies can be provided to each subscriber by an ISP. As noted above, the invention has particular application for remote access application.

In addition, implementation of ISN 150 as an edge router enables simple devices to be deployed at the subscriber premises. As an illustration, without the present invention, a subscriber at network 110 of FIG. 1 may need to implement a complex router 120 to provide different service policies. The management overhead may be unacceptably high. In contrast, by using the present invention, the desired service policies can be provided by a central remote access provider using suitable configuration of ISN 150, thereby simplifying the configuration and management of devices at subscriber premises.

9. Conclusion

While various embodiments of the present invention have been described above, it should be understood that they have been presented by way of example only, and not limitation.

Thus, the breadth and scope of the present invention should not be limited by any of the above-described embodiments, but should be defined only in accordance with the following claims and their equivalents.

What is claimed is:

1. An Internet service node (ISN) for providing a service policy for a subscriber, the ISN comprising:
   an access port operative to receive a plurality of bit groups related to a data flow;
   a switch fabric coupled to the access port, the switch fabric operative to receive the plurality of bit groups and to associate the plurality of bit groups with the data flow,
   a plurality of packet service cards coupled to the switch fabric, at least one of the packet service cards operative to receive the plurality of bit groups and to process each of the bit groups according to a processing rule derived from a service policy associated with the data flow, wherein each packet service card of the plurality of packet service cards corresponds to a different service policy type;
   the processing rule containing a classifier and an associated action, the classifier identifying at least one data flow to which the associated action is to be applied, the switch fabric being operative to forward the plurality of bit groups to a packet service card allocated for the associated data flow; and
   a trunk port coupled to the switch fabric, the trunk port operative to transmit the processed plurality of bit groups associated with the data flow,
   wherein processing the bit groups according to the processing rule enables the ISN to provide a service policy for the subscribers.

2. The ISN of claim 1, wherein the plurality of bit groups comprise Internet Protocol (IP) packets.

3. The ISN of claim 2, wherein the data flow is identified by source IP address, destination IP address, protocol type, source port number and destination port number.

4. The ISN of claim 3, further comprising an interface for enabling a manager to provide the service policy and wherein the ISN is designed to generate the processing rule based on the service policy provided by the manager.

5. The ISN of claim 4, wherein the packet service card is operative to monitor control data flows to determine parameters values identifying a second data flow if the parameter values of the second data flow are not available beforehand.

6. The ISN of claim 1, wherein the packet service card comprises a plurality of processors.

7. The ISN of claim 6, wherein the plurality of processors and the ports can be changed independent of each other.

8. The ISN of claim 7, wherein changing the processors and ports independent of each other enables the ISN to scale to serve a large number of subscribers as the number of processors can be increased.

9. The ISN of claim 7, wherein changing the processors independent of the ports includes changing the number of processors to increase the processing power of the ISN.

10. The ISN of claim 7, wherein changing the processors independent of the ports includes changing the processors to increase the processing power of the ISN.

11. The ISN of claim 6, wherein the packet service card processes the packets according to a plurality of processing rules and wherein a state is maintained for the data flow, wherein the state indicates the processing rule to be applied to the plurality of packets related to the data flow.

12. The ISN of claim 1, wherein the switch fabric is operative to generate a plurality of packets, and to associate the plurality of packets with the data flow, wherein the plurality of packets contains sufficient data to be identified with a data flow associated with the subscriber and wherein the bit groups comprise ATM cells such that the switch fabric is adapted to generate each of the packets from the payload in a plurality of ATM cells.

13. The ISN of claim 12, wherein the plurality of packets contains sufficient data to be identified with a control data flow, and wherein the ISN is operative to monitor the packets on the control flow to determine the port number of another flow.

14. The ISN of claim 1, wherein the bit groups comprise sufficient data to be identified with a data flow generated by the subscriber.

15. The ISN of claim 1, further comprising a random access memory (RAM), wherein the processor interface stores the plurality of bit groups in the RAM.

16. An Internet service node (ISN) for providing a service policy for a subscriber, the ISN comprising:
    an access port operative to receive a plurality of bit groups associated with a data flow;
    a switch fabric coupled to the access port, the switch fabric operative to receive the plurality of bit groups, and to examine higher level protocol information to determine a data flow associated with the received bit groups;
    a plurality of packet service cards coupled to the switch fabric, at least one of the packet service cards operative to receive the plurality of bit groups and to process the bit groups according to a processing rule derived from a service policy associated with the data flow, wherein each packet service card of the plurality of packet service cards corresponds to a different service policy type, each of the packet service cards comprising:
        a plurality of processor groups operative to receive bit groups and to process the bit groups; and
        a controller coupled to the plurality of processor groups and operative to assign bit groups to a processor group;
    the switch fabric being operative to forward the bit groups to a packet service card allocated for the associated data flow; and
    a trunk port coupled to the switch fabric, the trunk port operative to transmit the processed plurality of bit groups associated with the data flow;
    wherein processing the bit groups according to the processing rule enables the ISN to provide a service policy for the subscriber.

17. The ISN of claim 16, wherein the processing rule includes a classifier to identify a data flow and an action associated with the classifier to apply a bandwidth prioritization policy and a bandwidth allocation policy to bit groups associated with the data flow identified by the classifier.

18. The ISN of claim 16, wherein the trunk port is operative to receive a plurality of bit groups from the Internet and to send the bit groups to the switch fabric.

19. The ISN of claim 16, wherein the plurality of bit groups relates to a data flow and wherein a state is maintained for the data flow, wherein the state of the data flow indicates the processing rules to be applied to each of the plurality of packets associated with the data flow.

20. The ISN of claim 16, wherein the ISN is an edge device.

21. The ISN of claim 16, wherein the at least one packet service card is operative to examine a higher level protocol to determine the subscriber service policy according to which a bit group is to be processed.

22. The ISN of claim 21, wherein examining a higher level protocol comprises associating a bit group with a data flow by port number.

23. The ISN of claim 21, wherein examining a higher level protocol comprises associating a bit group with a data flow by IP address.

24. The ISN of claim 21, wherein examining a higher level protocol comprises associating a bit group with a data flow by protocol type.

25. The ISN of claim 16, wherein the plurality of packet service cards each further comprise random access memory (RAM), wherein the processor interface is operative to store received bit groups in the RAM, and wherein the controller is operative to determine which of the processors in a processor group may process a packet.

26. An Internet service node (ISN) for providing a service policy for a subscriber, the ISN comprising:
    an access port operative to receive a plurality of bit groups associated with a data flow;
    a switch fabric coupled to the access port, the switch fabric operative to receive the plurality of bit groups, and to examine higher level protocol information to determine a data flow associated with the received bit groups;
    a plurality of packet service cards coupled to the switch fabric, at least one of the packet service cards receiving the plurality of bit groups associated with the data flow and processing the bit groups according to a processing rule derived from a service policy associated with the data flow, wherein each packet service card of the plurality of packet service cards corresponds to a different service policy type, the switch fabric being operative to forward the bit groups to a packet service card allocated for the associated data flow; and
    a trunk port coupled to the switch fabric, the trunk port operative to transmit the processed plurality of bit groups associated with the data flow;
    wherein processing the bit groups according to the processing rule enables the ISN to provide a service policy for the subscriber.

27. The ISN of claim 26, wherein the packet service cards and the access and trunk ports can be changed independent of each other.

28. The ISN of claim 27, wherein changing the packet service cards and ports independent of each other enables the ISN to scale to serve a large number of subscribers.

29. The ISN of claim 28, wherein the packet service cards comprise a plurality of processors and wherein changing the packet service cards independent of the ports includes changing the number of processors to increase the processing power of the ISN.

30. The ISN of claim 28, wherein the packet service cards comprise a plurality of processors and wherein changing the packet service cards independent of the ports includes changing the processors to increase the processing power of the ISN.

31. The ISN of claim 26, wherein the ISN can support different access technologies.

32. The ISN of claim 31, wherein the ISN can support access technologies selected from the group of access technologies consisting of frame relay, ATM, packet over Sonet, Fast Ethernet, and Gigabit Ethernet.

33. The ISN of claim 26, wherein the switch fabric is operative to receive bit groups from the access port and forward the received bit groups to a packet service card upon receiving the data for an entire packet.

34. The ISN of claim 26, wherein at least one of the packet service cards is operative to monitor a control data flow of an application to determine a parameter value identifying another data flow of the application.

35. The ISN of claim 34, wherein the application is a voice-over-IP application.

36. The ISN of claim 26, wherein the trunk port is operative to receive a plurality of bit groups from the Internet and to send the bit groups to the switch fabric.

37. The ISN of claim 26:
wherein a state is maintained for the data flow at one of the processor cards; and
wherein the state of the data flow indicates a processing rule to be applied to the plurality of bit groups associated with the data flow.

38. The ISN of claim 26, wherein the ISN is an edge device.

39. The ISN of claim 26, wherein the access ports and trunk ports can be changed independent of the packet service cards.

40. A method for providing a service policy to a subscriber, the method comprising:
receiving a plurality of bit groups at an access port;
determining a data flow associated with the plurality of bit groups;
generating a plurality of packets from data associated with the data flow;
providing a plurality of processor groups, with each processor group containing a plurality of processors;
assigning packets to one of the plurality of processor groups, wherein one of the plurality of processors in the assigned processor group processes the assigned packets and wherein all packets related to the data flow are assigned to a single processor group;
selecting a processor card assigned to the data flow;
switching at least one bit group of the plurality of bit groups to the processor card;
applying a processing rule derived from a service policy associated with the data flow;
switching the at least one bit group from the processor card to a trunk port;
sending the at least one bit group out the trunk port, and wherein the processor card is selected based on a type of the service policy associated with the data flow.

41. The method of claim 40, wherein determining the data flow associated with the plurality of bit group comprises:
examining higher level protocol information to determine the data flow associated with the plurality of bit groups a bit group.

42. The method of claim 41, wherein the examining higher level protocol information comprises:
assembling data from the plurality of bit groups to form a packet of a higher level protocol; and
examining the packet to determine the data flow to which the packet relates.

43. The method of claim 42, wherein examining the packet comprises determining a data flow at least in part by determining port numbers.

44. The method of claim 40, wherein at least one of the plurality of bit groups is an ATM cell.

45. The method of claim 40, wherein at least one of the plurality of bit groups is a frame in frame relay.

46. The method of claim 40, wherein the method further comprises maintaining a state for the data flow, wherein the state of the data flow indicates a processing rule to be applied to the plurality of bit groups associated with the data flow.

47. The method of claim 40, wherein the method further comprises:
at a processor card,
receiving a plurality of bit groups associated with the data flow; and
examining higher level protocol information to determine a processing rule according to which the plurality of bit groups is to be processed.

48. The method of claim 47, wherein examining higher level protocol information comprises associating a bit group of the plurality of bit groups with the data flow by port number.

49. The method of claim 47, wherein examining higher level protocol information comprises associating a bit group of the plurality of bit groups with the data flow by protocol type.

50. The method of claim 47, wherein examining higher level protocol information comprises associating a bit group of the plurality of bit groups with the data flow by IP address.

51. The method of claim 47, wherein the method further comprises:
monitoring control data flow of an application to determine a port number of a new data flow initiated by an application; and
generating a new processing rule using the determined port number.

52. The method of claim 40, wherein at least one processor card comprises a plurality of processors and wherein the method further comprises increasing the number of processors enabling the ISN to scale to serve a large number of subscribers.

53. The method of claim 40, wherein the method further comprises:
assigning an IP address to a user system; and
dynamically generating a processing rule after the user system is assigned an IP address.

54. The method of claim 40, wherein the method further comprises:
providing the service policy using a central remote access provider.

55. The method of claim 40, wherein the method further comprises providing the processor card to provide a desired service policy type.

56. A method for providing a service policy to a subscriber, the method comprising:
receiving a plurality of bit groups at a trunk port;
determining a data flow associated with the plurality of bit groups;
selecting a processor card assigned to the data flow;
generating a plurality of packets from data associated with the data flow;
providing a plurality of processor groups, with each processor group containing a plurality of processors;
assigning packets to one of the plurality of processor groups, wherein one of the plurality of processors in the assigned processor group processes the assigned packets and wherein all packets related to the data flow are assigned to a single processor group
switching at least one bit group of the plurality of bit groups to the processor card;
applying a processing rule derived from a service policy associated with the data flow;
switching the at least one bit group from the processor card to an access port; and
sending the at least one bit group out the access port, wherein the processor card is selected based on a type of the service policy associated with the data flow.

57. The method of claim 56, wherein determining the data flow associated with the plurality of bit groups comprises:
examining higher level protocol information to determine the data flow associated with the plurality of bit groups.

58. The method of claim 57, wherein the examining higher level protocol information comprises:
assembling data from the plurality of bit groups to form a packet of a higher level protocol; and
examining the packet to determine the data flow to which the packet relates.

59. The method of claim 58, wherein examining the packet comprises determining a data flow at least in part by determining port numbers.

60. The method of claim 56, wherein at least one of the plurality of bit groups is an ATM cell.

61. The method of claim 56, wherein at least one of the plurality of bit groups is a frame in frame relay.

62. The method of claim 56, wherein the method further comprises maintaining a state for the data flow, wherein the state of the data flow indicates a processing rule to be applied to the plurality of bit groups associated with the data flow.

63. The method of claim 56, wherein the method further comprises:
at a processor card,
receiving a plurality of bit groups associated with the data flow; and
examining higher level protocol information to determine a processing rule according to which the plurality of bit groups is to be processed.

64. The method of claim 63, wherein examining higher level protocol information comprises associating a bit group of the plurality of bit groups with the data flow by port number.

65. The method of claim 63, wherein examining higher level protocol information comprises associating a bit group of the plurality of bit groups with the data flow by protocol type.

66. The method of claim 63, wherein examining higher level protocol information comprises associating a bit group of the plurality of bit groups with the data flow by IP address.

67. The method of claim 63, wherein the method further comprises:
monitoring control data flow of an application to determine a port number of a new data flow initiated by an application; and
generating a new processing rule using the determined port number.

68. The method of claim 56, wherein at least one processor card comprises a plurality of processors and wherein the method further comprises increasing the number of processors enabling the ISN to scale to serve a large number of subscribers.

69. The method of claim 56, wherein the method further comprises:
assigning an IP address to a user system; and
dynamically generating a processing rule after the user system is assigned an IP address.

70. The method of claim 56, wherein the method further comprises:
providing the service policy using a central remote access provider.

71. The method of claim 56, wherein the method further comprises providing the processor card to provide a desired service policy type.

72. The method of claim 56, wherein the method further comprises:
dynamically generating a processing rule upon the occurrence of a specific event, the processing rule comprising a classifier and an action associated with the classifier, wherein the classifier identifies data flows to which the associated action is to be applied; and
instantiating the processing rule upon generation of the processing rule.

73. The method of claim 56, wherein the processor card has one processor.

74. The method of claim 56, wherein the processor card comprises the plurality of processors and wherein each bit group of the plurality of bit groups associated with the data flow is assigned to a single processor.

75. An Internet service node (ISN) for providing a service policy for a subscriber, the ISN comprising:
a trunk operative to receive a plurality of bit groups associated with a data flow;
a switch fabric in communication with the trunk port, the switch fabric operative to receive a plurality of bit groups, and to examine higher level protocol information to determine a data flow associated with the received bit groups;
a plurality of packet service cards in communication with the switch fabric, at least one of the packet service cards receiving the plurality of bit groups associated with the data flow and processing the plurality of bit groups according to a processing rule derived from a service policy associated with the data flow, wherein each packet service card of the plurality of packet service cards corresponds to a different service policy type, the switch fabric being operative to forward the bit groups to the packet service card allocated for the associated data flow; and
an access port in communication with the switch fabric, the access port operative to transmit the processed plurality of bit groups associated with the data flow,
wherein processing the bit groups according to the processing rule enables the ISN to provide a service policy for the subscriber.

* * * * *